US011983903B2

(12) United States Patent
Houlsby et al.

(10) Patent No.: US 11,983,903 B2
(45) Date of Patent: May 14, 2024

(54) PROCESSING IMAGES USING SELF-ATTENTION BASED NEURAL NETWORKS

(71) Applicant: Google LLC, Mountain View, CA (US)

(72) Inventors: Neil Matthew Tinmouth Houlsby, Zurich (CH); Sylvain Gelly, Zurich (CH); Jakob D. Uszkoreit, Berlin (DE); Xiaohua Zhai, Zurich (CH); Georg Heigold, Aachen (DE); Lucas Klaus Beyer, Zurich (CH); Alexander Kolesnikov, Zurich (CH); Matthias Johannes Lorenz Minderer, Zurich (CH); Dirk Weissenborn, Berlin (DE); Mostafa Dehghani, Amsterdam (NL); Alexey Dosovitskiy, Berlin (DE); Thomas Unterthiner, Berlin (DE)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/500,034

(22) Filed: Nov. 1, 2023

(65) Prior Publication Data

US 2024/0062426 A1 Feb. 22, 2024

Related U.S. Application Data

(63) Continuation of application No. 17/492,537, filed on Oct. 1, 2021.
(Continued)

(51) Int. Cl.
*G06T 7/00* (2017.01)
*G06F 18/24* (2023.01)
(Continued)

(52) U.S. Cl.
CPC ............. *G06T 7/97* (2017.01); *G06F 18/24* (2023.01); *G06N 3/045* (2023.01); *G06N 3/08* (2013.01);
(Continued)

(58) Field of Classification Search
CPC ...... G06V 20/20; G06V 40/10; G06F 16/583; G06F 16/587; G06N 3/084; G06N 3/048
See application file for complete search history.

(56) References Cited

U.S. PATENT DOCUMENTS

| 6,850,252 B1 * | 2/2005 | Hoffberg | ............. H04N 21/475 |
| | | | 380/252 |
| 7,006,881 B1 * | 2/2006 | Hoffberg | ............. G06V 40/103 |
| | | | 709/200 |

(Continued)

FOREIGN PATENT DOCUMENTS

| JP | 2004-062605 | 2/2004 |
| WO | WO 2020175446 | 9/2020 |
| WO | WO 2021176566 | 9/2021 |

OTHER PUBLICATIONS

Anonymous, "An Image is Worth 16×16 Words: Transformers for Image Recognition at Scale" ICLR, 2021, 22 pages.
(Continued)

*Primary Examiner* — Yosef Kassa
(74) *Attorney, Agent, or Firm* — Fish & Richardson P.C.

(57) ABSTRACT

Methods, systems, and apparatus, including computer programs encoded on computer storage media, for processing images using self-attention based neural networks. One of the methods includes obtaining one or more images comprising a plurality of pixels; determining, for each image of the one or more images, a plurality of image patches of the image, wherein each image patch comprises a different subset of the pixels of the image; processing, for each image of the one or more images, the corresponding plurality of
(Continued)

image patches to generate an input sequence comprising a respective input element at each of a plurality of input positions, wherein a plurality of the input elements correspond to respective different image patches; and processing the input sequences using a neural network to generate a network output that characterizes the one or more images, wherein the neural network comprises one or more self-attention neural network layers.

21 Claims, 5 Drawing Sheets

Related U.S. Application Data

(60) Provisional application No. 63/087,135, filed on Oct. 2, 2020.

(51) Int. Cl.
    *G06N 3/045*     (2023.01)
    *G06N 3/08*     (2023.01)

(52) U.S. Cl.
    CPC ........... *G06T 2207/20081* (2013.01); *G06T 2207/20084* (2013.01)

(56) References Cited

U.S. PATENT DOCUMENTS

| | | | | |
|---|---|---|---|---|
| 8,516,266 B2* | 8/2013 | Hoffberg | ............... | G05B 15/02 |
| | | | | 715/239 |
| 8,559,689 B2* | 10/2013 | Mizuno | ............... | G06T 7/0014 |
| | | | | 382/128 |
| 8,583,263 B2* | 11/2013 | Hoffberg | ............... | H04N 5/913 |
| | | | | 700/83 |
| 10,210,178 B2* | 2/2019 | Souche | ............... | G06N 3/084 |
| 10,803,143 B2* | 10/2020 | Kamen | ............... | G16H 50/30 |
| 2019/0354858 A1 | 11/2019 | Chrzanowski et al. | | |

OTHER PUBLICATIONS

Chen et al, "Generative Pretraining From Pixels" Open AI, 2020, 12 pages.
Cordonnier et al, "On the Relationship Between Self-Attention and Convolutional Layers" ICLR, 2020, 18 pages.
International Preliminary Report on Patentability in International Appln. No. PCT/US2021/053424, dated Apr. 13, 2023, 10 pages.
International Search Report and Written Opinion in International Appln. No. PCT/US2021/053424, dated Feb. 11, 2022, 17 pages.
Kolesnikov et al, "Big Transfer (BiT): General Visual Representation Learning" CoRR, Submitted on May 2020, arXiv:1912.11370v3, 28 pages.
Notice of Allowance in Australian Appln. No. 2021354030, dated Nov. 15, 2023, 3 pages.
Office Action in Australian Appln. No. 2021354030, dated Apr. 20, 2023, 4 pages.
Oquab et al, "Learning and Transferring Mid-Level Image Representations Using Convolutional Neural Networks" IEEE, 2014, 8 pages.
Parmar et al, "Image Transformer" CoRR, Submitted on Jun. 2018, arXiv:1802.05751v3, 10 pages.
Ramachandran et al, "Stand-Alone Self-Attention in Vision Models" CoRR, Submitted on Jun. 2019, arXiv:1906.05909v1, 15 pages.
Vaswani et al, "Attention is All You Need" CoRR, Submitted on Dec. 2017, arXiv:1706.03762v5, 15 pages.
Office Action in Japanese Appln. No. 2022-570383, mailed on Jan. 15, 2024, 11 pages (with English translation).

* cited by examiner

PROCESSING IMAGES USING SELF-ATTENTION BASED NEURAL NETWORKS

CROSS-REFERENCE TO RELATED APPLICATIONS

This is a continuation of U.S. application Ser. No. 17/492,537, filed on Oct. 1, 2021, which claims priority to U.S. Provisional Application No. 63/087,135, filed on Oct. 2, 2020. The disclosures of the prior applications are considered part of and are incorporated by reference in the disclosure of this application.

BACKGROUND

This specification relates to processing images using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that executes a self-attention based neural network that has been configured through training to process one or more images to generate a network output that characterizes the one or more images.

The self-attention based neural network can be configured to process an input sequence representing an image by applying a self-attention mechanism across the elements of the input sequence, generating an output sequence. At least some of the elements of the input sequence can correspond to respective patches of the input image. That is, the system can segment the image into patches and process the pixels of each patch to generate a respective element of the input sequence. By applying a self-attention mechanism to these elements, the self-attention based neural network can attend over the entire image, leveraging both local and global information to generate the output sequence.

The subject matter described in this specification can be implemented in particular embodiments so as to realize one or more of the following advantages.

Some existing systems use self-attention based neural networks for natural language processing (NLP) use cases, processing a text sequence to generate a prediction about the text sequence. An advantage of self-attention based neural networks in the NLP domain is scalability; generally, the performance of a self-attention based neural network improves as the size of the neural network grows. However, in existing systems that apply self-attention based neural networks to images, the same has not been true; generally, the self-attention based neural networks have been unable to scale to larger architectures and therefore do not perform as well as other computer vision systems, e.g., convolutional neural networks. For example, some such existing systems do not apply self-attention across an entire input image and instead apply self-attention to local neighborhoods of the input image. Therefore, a first local neighborhood of the image cannot attend to a second local neighborhood of the image.

Using techniques described in this specification, a system can process images directly using a self-attention based neural network and enjoy high performance even as the size of the neural network grows. In particular, techniques described in this specification leverage the parallelization that is possible using self-attention based neural networks to permit large scale training, leading to improved accuracy in image processing tasks. As a particular example, systems described in this specification may be trained on datasets comprising 14 million to 300 million images. Furthermore, example implementations described in this specification apply global self-attention to full-size images. That is, the self-attention based neural network applies self-attention across an entire input image, and so any region of the image can attend to any other region of the image.

As described in this specification, a self-attention based neural network configured to process images can require far fewer computations to achieve the same performance as a state-of-the-art convolutional neural network. That is, for a fixed compute budget, the self-attention based neural network performs better than the convolutional neural network. This is because applying self-attention is generally more computationally efficient than convolving a kernel across an entire image, as the self-attention mechanism is able to attend to different regions of the image with fewer computations than convolution. As a particular example, a self-attention based neural network as described in this specification can achieve comparable or superior performance to large-scale convolutional neural networks while requiring 2×, 5×, 10×, 100×, or 1000× fewer computations.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that is configured to execute a self-attention based neural network configured to process one or more images, i.e., to process the intensity values of the pixels of the one or more images, to generate a network output that characterizes the one or more images.

Figure 1:
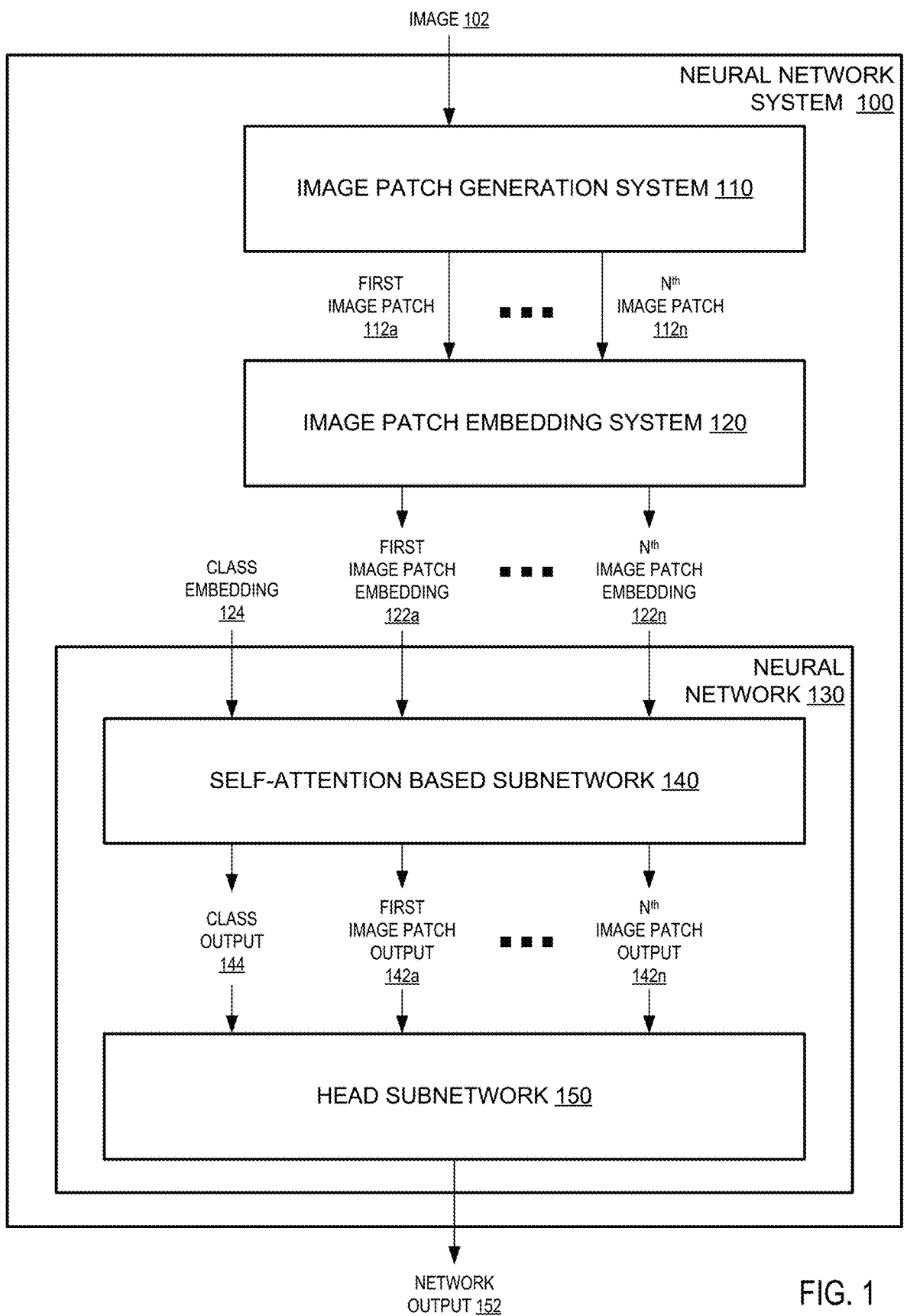
FIG. 1 is a diagram of an example neural network system.

FIG. 1 is a diagram of an example neural network system 100. The neural network system 100 is an example of a system implemented as computer programs on one or more computers in one or more locations, in which the systems, components, and techniques described below can be implemented.

The neural network system 100 is configured to process an image 102 and to generate a network output 152 that represents a prediction about the image. The neural network system 100 can be configured to perform any appropriate machine learning task using the image 102. Example machine learning tasks are discussed below.

The image can be any appropriate type of image. For example, the image can be a two-dimensional image, e.g., a two-dimensional image that has multiple channels (e.g., an RGB image). As another example, the image 102 can be a hyperspectral image that represents a continuous spectrum of wavelengths, e.g., by identifying, for each pixel in the image 102, a distribution over the spectrum. As another example, the image 102 can be a point cloud that includes multiple points, where each point has a respective coordinate, e.g., in a three-dimensional or a higher-dimensional coordinate space; as a particular example, the image 102 can be a point cloud generated by a LIDAR sensor. As another example, the image 102 can be a medical image generating by a medical imaging device; as particular examples, the image 102 can be a computer tomography (CT) image, a magnetic resonance imaging (MRI) image, an ultrasound image, an X-ray image, a mammogram image, a fluoroscopy image, or a positron-emission tomography (PET) image.

Although the below description refers to generating image patches of the image 102 that each include respective "pixels" of the image 102, it is to be understood that the neural network system 100 can generate image patches that include components of the image 102 that are of any appropriate type. For example, if the image 102 is a point cloud, then each image patch of the image 102 can include a subset of the points in the point cloud. As another example, if the image 102 is an MRI image that includes multiple voxels in a three-dimensional voxel grid, then each image patch of the image 102 can include a subset of the voxels in the voxel grid.

The neural network system 100 includes an image patch generation system 110, an image patch embedding system 120, and a neural network 130. As is described in more detail below, the neural network 130 is a self-attention based neural network that includes a self-attention based subnetwork 140.

A self-attention based neural network is a neural network that includes one or more self-attention neural network layers. A self-attention neural network layer is configured to receive as input a sequence of layer input elements and to apply an attention mechanism over the sequence of layer input elements to generate a sequence of layer outputs elements. In particular, for each layer input element, the self-attention neural network layer applies the attention mechanism over the layer input elements in the sequence of layer input elements using one or more queries derived from the layer input element to generate a respective output element.

In the example depicted in FIG. 1, the neural network 130 is configured to process, using the self-attention based subnetwork 140, an input sequence that includes input elements representing respective patches of the image 102. Thus, the neural network 130 can apply an attention mechanism to the input sequence in order to attend to different patches at different locations in the image 102. It will be understood that the patches of the image 102 may be processed by the self-attention based subnetwork 140 using parallel processing, i.e. at least part of the processing may be performed in parallel.

The image patch generation system 110 is configured to process the image 102 and to generate n different patches 112a-n of the image 102. In this specification, an image patch of an image is a strict subset of the pixels of the image. Generally, each image patch 112a-n includes multiple contiguous pixels of the image 102. That is, for each particular image patch 112a-n and for any pair of pixels in the particular image patch 112a-n, there exists a path from the first pixel of the pair to the second pixel of the pair where the path only includes pixels in the particular image patch 112a-n.

In some implementations, each pixel in the image 102 is included in exactly one of the image patches 112a-n. In some other implementations, one or more image patches 112a-n can include the same pixel from the image 102, i.e., two or more of the images patches can overlap. Instead or in addition, one or more pixels from the image 102 can be excluded from each of the image patches 112a-n, i.e., one or more pixels are not included in any of the image patches.

The image patches 112a-n can be represented in any appropriate way. For example, each image patch 112a-n can be represented as a two-dimensional image that includes the pixels of the image patch 112a-n, e.g., an image that maintains the spatial relationships of the pixels in the image patch 112a-n.

As another example, each image patch 112a-n can be represented as a one-dimensional sequence of the pixels of the image patch 112a-n. As a particular example, if the image patch 112a-n is a two-dimensional region of the image 102, then the image patch 112a-n can be a flattened version of the two-dimensional region, as is described in more detail below. As another particular example, if the image patch 112a-n includes only pixels that share the same column or row of the image 102 (i.e., if the image patch 112a-n is a one-dimensional region of the image 102), then the image patch 112a-n can be represented as a one-dimensional sequence that maintains the relative positions of the pixels.

As another example, each image patch 112a-n can be represented as an unordered set of the pixels of the image patch 112a-n.

Example image patches are described in more detail below with reference to FIG. 3.

The image patch embedding system 120 is configured to obtain the n image patches 112a-n of the image 10, and to generate a respective embedding 122a-n of each of the n image patches 112a-n. Each image patch embedding 122a-n represents the pixels of the corresponding image patch 112a-n and can be generated by processing the pixels of the corresponding image patch 112a-n. In this specification, an embedding is an ordered collection of numeric values that represents an input in a particular embedding space. For example, an embedding can be a vector of floating point or other numeric values that has a fixed dimensionality.

In some implementations in which each image patch 112a-n is represented as a two-dimensional sub-image of the image 102, each image patch embedding 122a-n is a reshaped version of the corresponding image patch 112a-n. For example, the image patch embedding system 120 can "flatten" each image patch 112a-n to generate an image patch embedding 122a-n that is a one-dimensional tensor that includes each pixel in the image patch 112a-n. As a particular example, if each image patch 112a-n has dimensionality L×W×C, where C represents the number of channels of the image (e.g., C=3 for an RGB image), then the image patch embedding 122a-n can generate an image patch embedding 122a-n that has dimensionality 1×(L·W·C).

In some other implementations, the image patch embedding system 120 can process a one-dimensional tensor that includes the pixels of the image patch 112a-n (e.g., a flattened version of the image patch 112a-n) to generate the corresponding image patch embedding 122a-n. As described in more detail below, the image patch embeddings 122a-n are to be processed by the neural network 130, which has been configured through training to accept inputs having a particular format, e.g., a particular size and shape. Thus, the image patch embedding system 120 can project each image patch 112a-n into a coordinate space that has the dimensionality required by the neural network 130.

For example, the image patch embedding system 120 can process each image patches 112a-n using a linear projection:

$$z_i = x_i E_i + b_i$$

where $z_i \in R^D$ is the $i^{th}$ image patch embedding 122a-n, D is the input dimensionality required by the neural network 130, $x_i \in R^N$ is the one-dimensional tensor including the $i^{th}$ image patch 112a-n, N is the number of pixels in the $i^{th}$ image patch 112a-n, $E_i \in R^{N \times D}$ is a projection matrix, and $b_i \in R^D$ is a linear bias term.

In some implementations, the image patch embedding system 120 uses a respective different projection matrix $E_i$ to generate each image patch embedding 122a-n; in some other implementations, the image patch embedding system 120 uses the same projection matrix E to generate each image patch embedding 122a-n. Similarly, in some implementations, the image patch embedding system 120 uses a respective different bias term $b_i$ to generate each image patch embedding 122a-n; in some other implementations, the image patch embedding system 120 uses the same bias term $b_i$ to generate each image patch embedding 122a-n.

In some implementations, the linear projection is machine-learned. For example, during training of the neural network 130, a training system can concurrently update the parameters of the linear projection (e.g., the parameters of the projection matrices $E_i$ and bias terms $b_i$). As a particular example, the training system can update the parameters of the linear projection by backpropagating a training error of the neural network 130 through the neural network 130 and to the image patch embedding system 120, and determining the update using stochastic gradient descent on the backpropagated error. Example techniques for training the neural network 130 are discussed in more detail below with reference to FIG. 4.

Instead of or in addition to processing the one-dimensional tensors corresponding to the image patches 112a-n with a linear projection, the image patch embedding system 120 can process the one-dimensional tensors using an embedding neural network. For instance, the embedding system 120 can be considered a component of the neural network 130. That is, the embedding system 120 can be an embedding subnetwork of the neural network 130 that includes one or more neural networks layers that are configured to process the one-dimensional tensors and to generate the image patch embeddings 122a-n.

For example, the embedding neural network can include one or more feedforward neural network layers that are configured to process a one-dimensional tensor corresponding to the image patch 112a-n.

As another example, the embedding neural network can include one or more self-attention neural network layers that are configured to process each one-dimensional tensor corresponding to a respective image patch 112a-n concurrently using a self-attention mechanism. Self-attention is discussed in more detail below.

As another example, the embedding neural network can include one or more convolutional neural network layers that are configured to process an image patch 112a-n using a convolutional filter. As a particular example, if the image patches 112a-n are represented as two-dimensional images, the image patch embedding system 120 can process each (unflattened) image patch 112a-n using one or more convolutional neural network layers to generate a feature map of the image patch 112a-n. The image patch embedding system 120 can then flatten the feature map and process the flattened feature map using a linear projection, as described above, to generate the corresponding image patch embedding 122a-n.

As another particular example, the image patch embedding system 120 can process the entire image 102 using one or more convolutional neural network layers to generate a feature map of the image 102. The feature map can be two-dimensional (or, like the image 102, can be two-dimensional where each element has multiple channels). The neural network system 100 can then determine n patches of the feature map of the image 102, where each patch includes one or more elements of the feature map. That is, instead of segmenting the image 102 itself into the image patches 112a-n, the image patch generation system 110 can segment the feature map of the image 102 generated by the embedding neural network of the image patch embedding system 120. As a particular example, each patch can include a single element of the feature map. The image patch embedding system 120 can then generate the image patch embeddings 122a-n from the n patches of the feature map, e.g., by applying a linear projection to the patches of the feature map as described above.

After the image patch embedding system 120 generates the image patch embeddings 122a-n, the neural network system 100 can generate the input sequence to be provided as input to the neural network 130 from the image patch embeddings 122a-n. Generally, the input sequence includes one or more input elements corresponding to respective image patch embeddings 122a-n. For example, the input sequence can include a respective input element corresponding to each of the n image patch embeddings 122a-n. As a particular example, the input elements corresponding to the n image patch embeddings 122a-n can be sorted in the input sequence in the raster order of the corresponding image patches 112a-n.

In some implementations, the input element in the input sequence corresponding to an image patch embedding 122a-n is equal to the image patch embedding 122a-n itself.

In some other implementations, to generate the input element of the input sequence corresponding to an image patch embedding 122a-n, the neural network system 100 can combine (i) the image patch embedding 122a-n and (ii) a positional embedding that represents the position within the image 102 of the image patch 112a-n corresponding to the image patch embedding 122a-n. For example, the neural network system 100 can append the positional embedding to the image patch embedding 122a-n. By incorporating the positional embeddings, the neural network system 100 can encode spatial information, e.g., the relative positioning of each image patch in the image, that can be leveraged by the neural network 130 to generate the network output 152.

In some implementations, the positional embedding corresponding to each image patch 112a-n of the image 102 is an integer. For example, a first image patch at the top left of the image 102 can have a positional embedding of '1', a second image patch immediately to the right of the first image patch can have a positional embedding of '2', and so on.

In some other implementations, the positional embeddings are machine-learned. For example, during the training of the neural network 130, a training system can concurrently learn the positional embeddings by backpropagating a training error of the neural network 130 through the neural network 130 and to the positional embeddings. In some such implementations, the training system can generate a respective different positional embedding for each image patch (e.g., assuming every image 102 received by the neural network system 100 is segmented into the same number of patches).

In some other implementations, the training system can incorporate two-dimensional information into the positional embeddings by learning, for both dimensions of the image 102, a respective positional embedding for each coordinate along the dimension. For example, if the image 102 is segmented into a two-dimensional grid of image patches 112a-n, the training system can generate two sets of positional embeddings: a first set that includes a respective positional embedding for each index along the vertical axis of the grid and a second set that includes a respective embedding for each index along a horizontal axis of the grid. To generate the positional embedding for a particular image patch 112a-n, the neural network system can combine, e.g., by concatenating, (i) the positional embedding corresponding to the index of the particular image patch 112a-n along the vertical axis, and (ii) the positional embedding corresponding to the index of the particular image patch 112a-n along the horizontal axis.

In some implementations, one or more of the input elements in the input sequence do not correspond to any image patch 112a-n of the image 102. For example, the input sequence can include a class embedding 124 that is the same for all received images 102. For example, the class embedding 124 can be a tensor having the same dimensionality as the image patch embeddings 122a-n. As a particular example, the class embedding 124 can be a tensor of all '0's or all '1's.

The class embedding 124 can be inserted at any position in the input sequence; e.g., the class embedding 124 can be the first input element of the input sequence, or the last input element of the input sequence.

In some implementations, the class embedding 124 is machine-learned. For example, during the training of the neural network 130, a training system can concurrently learn parameters for the class embedding 124 by backpropagating a training error of the neural network 130 through the neural network 130 and to the class embedding 124.

In implementations in which the input element corresponding to each image patch 112a-n includes a positional embedding corresponding to the image patch 112a-n, the neural network system 100 can append a positional embedding to the class embedding 124 as well, e.g., a machine-learned positional embedding or a predetermined positional embedding (e.g., a positional embedding of all '0's or all '1's).

After generating the input sequence, the neural network system 130 can provide the input sequence as input to the neural network 130. The neural network 130 can process the input sequence to generate the network output 152.

In particular, the neural network 130 can process the input sequence using the self-attention based subnetwork 140 to generate an output sequence. In some implementations, the neural network 130 generates an output sequence of the same length as the input sequence, i.e., that includes a respective output element for each input element in the input sequence. In particular, the output sequence can include a class output 144 generated from the class embedding 124 and a respective image patch output 142a-n corresponding to each image patch embedding 122a-n in the input sequence.

The self-attention based subnetwork 140 can include one or more self-attention neural network layers that each receive a layer input sequence and apply a self-attention mechanism to the layer input sequence to generate a layer output sequence. In some such implementations, the self-attention based subnetwork 130 includes a sequence of multiple network blocks that are each configured to receive a respective block input sequence that includes a respective element corresponding to each input element in the input sequence, and process the block input sequence to generate a respective block output sequence that includes a respective element for each input element in the input sequence. Each network block can include one or more self-attention neural network layers. An example self-attention based neural network is described in more detail below with reference to FIG. 2.

After the self-attention based subnetwork 140 generates the output sequence, the neural network 130 can provide one or more elements of the output sequence to a head subnetwork 150.

For example, the head subnetwork 150 can be configured to process the n image patch outputs 142a-n. As a particular example, the head subnetwork 150 can combine the n image patch outputs 142a-n (e.g., using global average pooling) to generate a combined patch output, then process the combined patch output to generate the network output 152. For instance, the head subnetwork 150 can process the combined patch output using one or more feedforward neural network layers and/or a linear classifier.

As another example, the head subnetwork 150 can be configured to process only the class output 144 to generate the network output 152. That is, the class output 144 can represent a final representation of the image 102, and the head subnetwork 150 can process the class output 144 to generate the network output 152 that represents the prediction about the image 102. For example, the head subnetwork 150 can include a multi-layer perceptron with one or more feedforward neural network layers.

In some implementations, the self-attention based subnetwork 140 and the head subnetwork 150 have been trained concurrently end-to-end on a single machine learning task. For example, a training system can execute a supervised training process using a training data set that includes multiple training examples that each include a training input sequence (representing respective training images) and a corresponding ground-truth network output, i.e., an output that represents the network output 152 that the neural network 130 should generate in response to processing the training input sequence. The training system can process the training input sequences using the neural network 130 to generate respective predicted network outputs, and determine a parameter update to the head subnetwork 150 and the self-attention based subnetwork 140 according to an error between (i) the predicted network outputs and (ii) the corresponding ground-truth network outputs. For instance, the training system can determine the parameter update by backpropagating the error through both the head subnetwork 150 and the self-attention based subnetwork 140 and performing stochastic gradient descent.

In some other implementations, the self-attention based subnetwork 130 has been trained using transfer learning, using one or more other head subnetworks that are different from the head subnetwork 150, e.g., that are configured to perform respective different machine learning tasks than the head subnetwork 150. For example, a training system can concurrently train the self-attention based subnetwork 130 and the one or more other head subnetworks, then remove the one or more other head subnetworks and replace them with the head subnetwork 150 to generate the neural network 130. The training system can then fine-tune the neural network 130 to generate trained parameters for the head subnetwork 150. Example techniques for training the neural network 130 using transfer learning are discussed in more detail below with reference to FIG. 4.

In some implementations, the neural network includes one or more additional subnetworks, e.g., one or more subnetworks directly preceding the self-attention based subnetwork 140 (e.g., a subnetwork that includes one or more recurrent neural network layers configured to process the input sequence) or directly following the self-attention based subnetwork 130 (e.g., a subnetwork that includes one or more recurrent neural network layers configured to process the input sequence).

In some implementations, the neural network 130 does not include the head subnetwork 150. For example, the neural network system 100 may be configured to generate an embedding of the image 102, where the embedding includes (or is generated from) one or more of the image patch output 142a-n and/or the class output 144. The neural network system 100 can then provide the embedding of the image 102 to a downstream system for storage or further processing, e.g., by one or more other neural networks.

For example, the neural network system can be configured to receive images 102 from an external system and to provide embeddings of the images 102 back to the system, e.g., by providing the image patch outputs 142a-n and/or the class output 144 back to the external system. The external system can be configured to process, for each image, the embedding of the image using a neural network to generate a prediction about the image; e.g., the external system can include the head subnetwork 150. As a particular example, the neural network system 100 can be configured to receive images from edge devices, e.g., mobile phone, tablet computers, or autonomous vehicles. The edge device can then execute the head subnetwork 150 to generate the prediction about the image.

As described in more detail below with reference to FIG. 4, in some implementations, the self-attention based subnetwork 140 includes many more parameters than the head subnetwork 150, and so can be more computationally expensive to execute. Thus, an edge device may not have the computational resources to execute the self-attention based subnetwork 140. Thus, the neural network system 100 can be configured to execute the self-attention based subnetwork 140 (e.g., using one or more parallel processing devices such as GPUs or TPUs), while the edge device can perform the relatively computationally-inexpensive task of executing the head subnetwork 150. For instance, the neural network system 100 can be deployed on the cloud and can be communicatively connected to multiple different edge devices.

The neural network system 100 can be configured to perform any appropriate machine learning task with respect to the image 102, e.g., a classification task, a regression task, or a combination thereof.

As a particular example, the neural network system 100 can be configured to generate a classification output that includes a respective score corresponding to each of multiple categories. The score for a category indicates a likelihood that the image belongs to the category. In some cases, the categories may be classes of objects (e.g., dog, cat, person, and the like), and the image may belong to a category if it depicts an object included in the object class corresponding to the category. In some cases, the categories may represent global image properties (e.g., whether the image depicts a scene in the day or at night, or whether the image depicts a scene in the summer or the winter), and the image may belong to the category if it has the global property corresponding to the category.

As another particular example, the neural network system 100 can be configured to generate a pixel-level classification output that includes, for each pixel in the image, a respective score corresponding to each of multiple categories. For a given pixel, the score for a category indicates a likelihood that pixel belongs to the category. In some cases, the categories may be classes of objects, and a pixel may belong to a category if it is part on an object included in the object class corresponding to the category. That is, the pixel-level classification output may be semantic segmentation output.

As another particular example, the neural network system 100 can be configured to generate a regression output that estimates one or more continuous variables (i.e., that can assume infinitely many possible numerical values) that characterize the image. In a particular example, the regression output may estimate the coordinates of bounding boxes that enclose respective objects depicted in the image. The coordinates of a bounding box may be defined by (x, y) coordinates of the vertices of the bounding box. For example, the system may output the (x, y) coordinates of two of the coordinates of the bounding box or can output the coordinates of the center of the bounding box and the height and width of the bounding box.

In some implementations, the neural network system 100 can be configured to perform a video analysis task. For example, the neural network system 100 can receive multiple images 102 that are video frames of a video, and can process each video frame as described above to generate an output that characterizes the video frames, e.g., by characterizing whether the video frames depict a person performing a particular action.

In some such implementations, the neural network system 100 processes each video frame at respective different time points to generate a respective network output 152 for each video frame that characterizes a prediction for the video frame. For example, the neural network system 100 can generate a network output 152 that predicts a classification of the video frame. In some such implementations, the neural network system 100 combines the multiple network outputs 152 corresponding to respective video frames to generate a final network output that characterizes the video. For example, the neural network system 100 can process the respective network outputs 152 using a downstream neural network, e.g., a recurrent neural network.

In some other implementations, the neural network system 100 processes each video frame concurrently to generate a single network output 152 that characterizes the video. That is, the neural network system 100 can be configured to process multiple images 102 concurrently. For example, the neural network system 100 can generate a respective input sequence for the neural network 130 corresponding to each image 102 as described above. The neural network system 100 can then combine the multiple input sequences into a single combined input sequence, e.g., by concatenating the input sequences, and then process the combined input sequence using the neural network 130.

Figure 2:
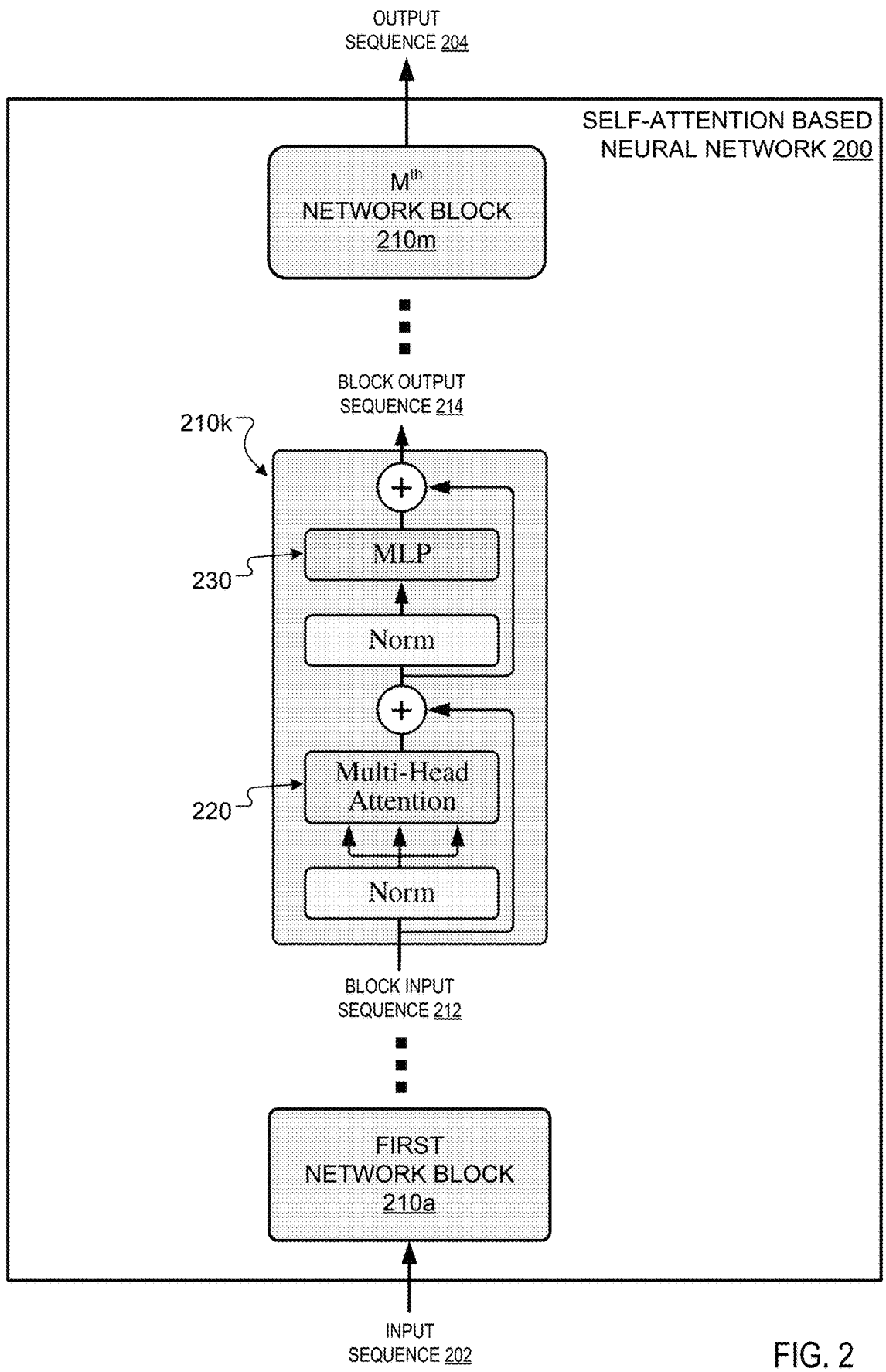
FIG. 2 is a diagram of an example self-attention based neural network.

FIG. 2 is a diagram of an example self-attention based neural network 200. The self-attention based neural network 200 can be a component of a neural network system, e.g., the neural network system 100 described above with reference to FIG. 1, that is configured to process an image and to generate a prediction about the image. In particular, the self-attention based neural network can be a subnetwork of a neural network, e.g., the neural network 130 described above with reference to FIG. 1, that is configured to generate a network output that represents the prediction about the image.

The self-attention based neural network 200 is configured to process an input sequence 202 that represents an image and that includes a respective input element at each of multiple input positions. For example, the input sequence 202 can include respective input elements representing each of multiple image patches of the image, as described above with reference to FIG. 1. The self-attention based neural network 200 is configured to process the input sequence 202 to generate an output sequence 204 having the same length as the input sequence 202, i.e., having the same number of output elements as there are input elements in the input sequence 202.

The self-attention based neural network 200 includes a sequence of M network blocks 210a-m, M≥1. Each network block 210a-m is configured to receive a block input sequence that includes a respective block input element for each input position in the input sequence 202; that is, each block input element corresponds to a respective input element of the input sequence 202. Each network block 210a-m is configured to process the block input sequence and to generate a block output sequence that includes a respective block output element for each of the multiple input positions in the input sequence. That is, each block input sequence 212 preserves the number of elements in the input sequence 202 as the input sequence is processed by the neural network 200.

The first network block 210a in the sequence can receive the input sequence 202. Each subsequent network block 210a-m in the sequence can receive, as the block input sequence, the respective block output sequence generated by the preceding network block 210a-m in the sequence. The block output sequence of the $M^{th}$ and final network block 210m can be the output sequence 204.

Each network block 210a-m includes one or more self-attention neural network layers. Referring to the $k^{th}$ network block 210k, the network block 210k includes a single self-attention neural network layer 220. In some implementations, the self-attention neural network layer 220 is configured to obtain the respective block input elements in the block input sequence 212 and apply an attention mechanism over the block input elements. In some other implementations, the self-attention neural network layer 220 is configured to obtain respective processed versions of the block input elements in the block input sequence 212 and apply the attention mechanism over the processed block input elements. For example, as depicted in FIG. 2, the network block 210k can first apply a layer normalization layer to the block input sequence 212 before providing the output of the layer normalization layer to the self-attention neural network layer 220. Instead or in addition, the network block 210k can apply one or more other neural network layers to the block input sequence 212 before the self-attention neural network layer 220, e.g., one or more element-wise feedforward neural network layers.

In particular, for the respective block input element (or processed version thereof) corresponding to each particular input position, the self-attention neural network layer 220 is configured to apply an attention mechanism over the block input elements at the input positions (i.e., the other block input positions and, in some implementations, itself) using one or more queries derived from the block input element at the particular input position to generate a respective output for the particular position. The output of the self-attention neural network layer 220 is a layer output sequence that includes a respective layer output element corresponding to each input position.

In some implementations, some or all of the self-attention neural network layers in the self-attention based neural network 200 (e.g., the self-attention neural network layer 220 depicted in FIG. 2) are multi-head self-attention neural network layers. A multi-head self-attention neural network layer applies h different attention mechanisms in parallel to generate respective sequences of layer output elements, and then combines the multiple sequences of layer output elements to generate a final sequence of layer output elements.

In some implementations, some or all of the self-attention neural network layers in the self-attention based neural network 200 (e.g., the self-attention neural network layer 220 depicted in FIG. 2) incorporate positional information of the respective block input elements in the block input sequence into the attention mechanism.

For example, when applying attention with respect to a particular block input element (i.e., when generating the respective layer output element corresponding to the particular block input element), the self-attention neural network layer can identify an attention positional embedding representing the position of the image patch corresponding to the particular block input element within the image. For example, the attention positional embeddings corresponding to each image patch can be the same as the positional embeddings incorporated into the input sequence 202.

When generating the respective layer output element corresponding to the particular block input element, the self-attention neural network layer can then execute two different attention computations, e.g., sequentially or in parallel: (i) a first attention computation in which a query generated from the particular block input element attends to a set of keys generated from respective block input elements (i.e., the attention mechanism described above); and (ii) a second attention computation in which a query generated from the attention positional embedding of the particular block input element attends to a set of keys generated from attention positional embeddings of respective block input elements. The self-attention neural network layer can then combine the outputs of the two attention computations to generate a final layer output element for the particular block input element, e.g., by determining the sum of the outputs of the two attention computations.

As another example, when applying attention with respect to a particular block input element, the self-attention neural network layer can determine the respective offset between (i) the particular block input element and (ii) each other block input element. For example, block input elements that are adjacent within the block input sequence can have an offset of '1', and so on.

The self-attention neural network layer can identify a respective offset embedding corresponding to each offset. For example, the offset embeddings corresponding to each offset can be machine-learned during the training of the neural network 200, e.g., as described above with reference to the positional embeddings incorporated into the input sequence 202.

The self-attention neural network layer can then execute two attention computations as described above, except using the offset embeddings instead of the attention positional embeddings during the second attention computation.

In some implementations, one or more of the network blocks 210a-m include a residual connection layer that combines the outputs of a self-attention neural network layer with the inputs to the self-attention neural network layer. Instead or in addition, one or more network blocks 210a-m can include a layer normalization layer that applies layer normalization to the input and/or the output of a self-attention neural network layer. These layers are referred to as "Norm" operations in FIG. 1.

In some implementations, one or more network blocks 210a-m include one or more position-wise feed-forward neural network layers. For example, the $k^{th}$ network block 210k includes the feed-forward neural network layer 230. The feed-forward layers 230 is configured to, for each input position of the input sequence 202, receive an input element at the position and apply a sequence of transformations to the input element at the position to generate an output element for the position. For example, the sequence of transformations can include two or more learned linear transformations each separated by an activation function, e.g., a nonlinear elementwise activation function, e.g., a ReLU activation function. As a particular example, the feedforward neural network can be a multi-layered perceptron that includes one, two, or more feedforward neural network layers. The input elements received by the position-wise feed-forward layer 230 can be the outputs of a layer normalization layer that follows the self-attention neural network layer 220, or the input elements received by the position-wise feed-forward layer 230 can be the outputs of the self-attention neural network layer 220 itself when there is no layer normalization layer.

In some implementations, one or more of the network blocks 210a-m include a residual connection layer that combines the outputs of a position-wise feed-forward neural network layer with the inputs to the position-wise feed-forward neural network layer.

As described above, in some implementations, each input element of the input sequence 202 includes or has been generated from a respective positional embedding. Instead of or in addition to incorporating a positional embedding to the input elements of the input sequence 202, the self-attention based neural network 200 can incorporate positional embeddings to the block input elements of the respective block input sequence 212 of one or more of the network blocks 210a-m. For example, before processing the respective block input sequence 212 of each network block 210a-m, the self-attention based neural network can append a respective positional embedding to each block input element of the block input sequence 212, e.g., a machine-learned positional embedding. In some implementations, each network block 210a-m uses a respective different set of learned positional embeddings. In some other implementations, each network block 210a-m uses the same set of learned positional embeddings.

After generating the output sequence 204, the self-attention based neural network 200 can provide the output sequence 204 to one or more downstream systems. For example, the self-attention neural network 200 can provide the output sequence 204 to one or more head neural networks to generate predictions for respective machine learning tasks, as described above with reference to FIG. 1. As another example, the self-attention based neural network 200 can provide the output sequence 204, which can represent an embedding of the image corresponding to the input sequence 202, to a database or to one or more downstream machine learning models for further processing.

Figure 3:
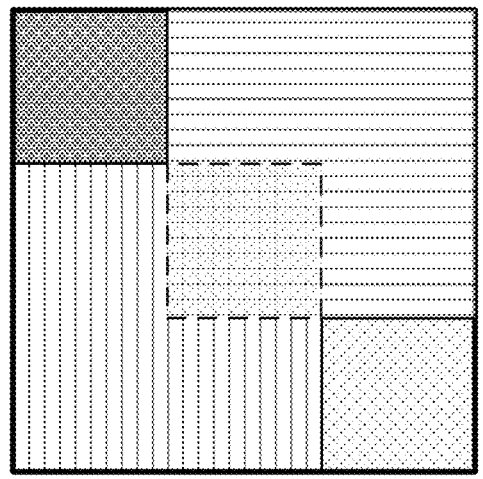
FIG. 3 illustrates example images segmented into image patches.
Figure 3:
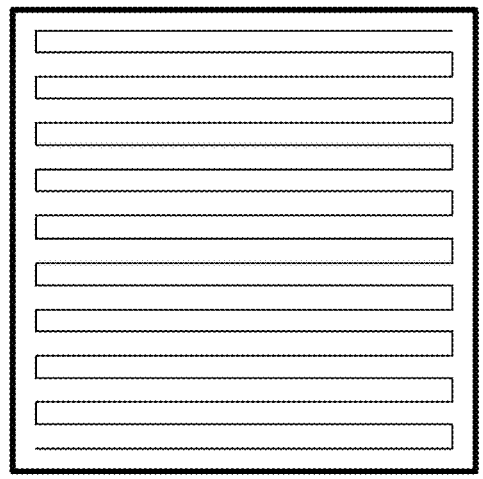
Figure 3:
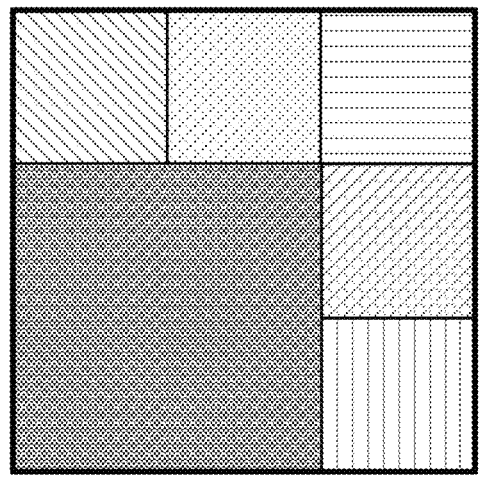
Figure 3:
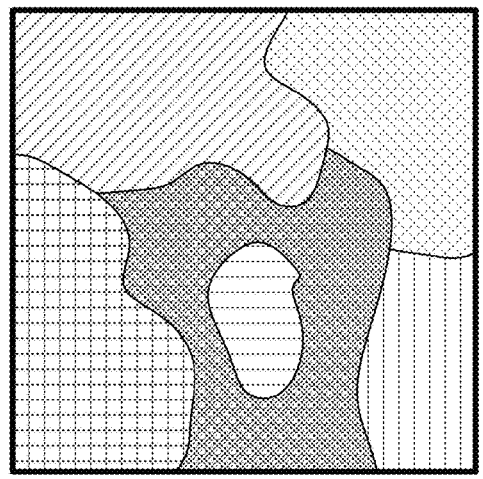
Figure 3:
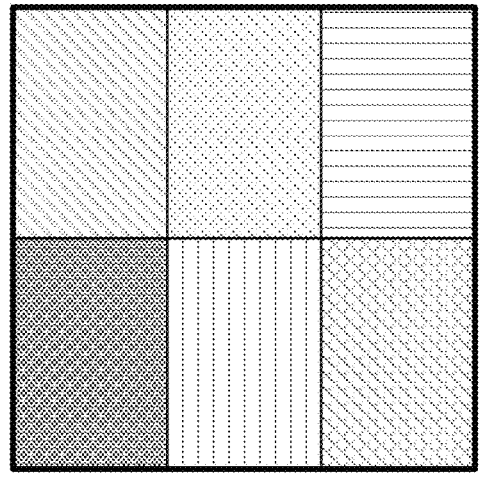
Figure 3:
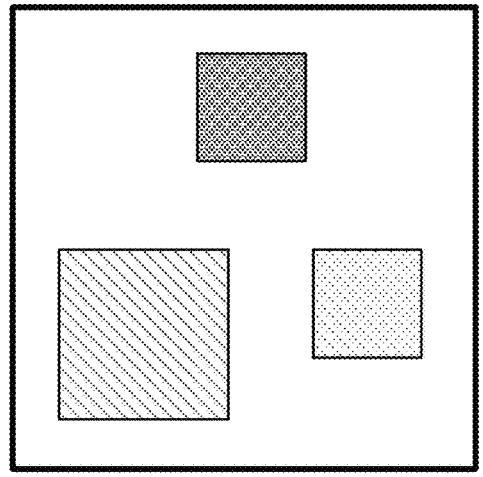

FIG. 3 illustrates example images 310, 320, 330, 340, 350, and 360 segmented into image patches.

The images 310-360 can be provided as input to a neural network system, e.g., the neural network system 100 described above with reference to FIG. 1, that is configured to process the images 310-360 to generate a prediction about the images 310-360. The neural network system can include an image patch generation system, e.g., the image patch generation system 110 described above with reference to FIG. 1, that segments the images 310-360 into multiple image patches. The image patches, or a network input generated from the image patches, can then be processed by a self-attention based neural network to generate the prediction about the images.

The images 310, 320, 330, 340, 350, and 360 depict different possibilities for segmenting images into image patches. In particular, in FIG. 3, each image 310 is depicted as segmented into a set of multiple image patches that are each visually distinct, i.e., using different shading or hatching. Generally, an image generation system would be configured to segment all received images according to the same schema. That is, the same image generation system would not necessarily segment each of the images 310, 320, 330, 340, 350, and 360 as depicted, because the images have been segmented according to different schema.

As depicted in the first image 310, in some implementations, the image patch generation system can generate image patches that each have the same size and shape, e.g., each image patch can be a rectangle. Furthermore, in some implementations, the image patch generation system can segment the first image 310 such that every pixel is a member of exactly one image patch. As a particular example, as depicted in FIG. 3, the image patches can represent a grid of same-sized rectangles. As another particular example, the image patches can represent a grid of same-sized hexagons.

As depicted in the second image 320, in some implementations, the image patch generation system can generate image patches that have different sizes.

As depicted in the second image 330, in some implementations, the image patch generation system can segment the third image 330 such that some pixels are members of multiple different image patches.

As depicted in the fourth image 340, in some implementations, the image patch generation system can segment the fourth image 340 such that some pixels are not members of any image patch. For example, the image generation system can process the fourth image 340 using a machine learning model to identify one or more regions of interest, and the image patch generation system can generate a respective patch for each identified region of interest. For example, the machine learning model can be configured to identify one or more pixels, and the image patch generation system can generate a respective patch centered at each identified pixel.

As depicted in the fifth image 350, in some implementations, the image patch generation system can generate image patches of arbitrary shape. That is, the image patches are not required to be rectangular. For example, the image generation system can process the fifth image 350 using a machine learning model that is configured to segment the fifth image 350, e.g., by assigning each pixel in the fifth image 350 a respective class. The image patch generation system can then generate a respective patch for each contiguous set of pixels that have been assigned the same class by the machine learning model.

As depicted in the sixth image 360, in some implementations, the image patch generation system can generate a one-dimensional space-filling curve that includes each pixel of the image. The image patch generation system can then segment the one-dimensional space-filling curve to generate a set of one-dimensional image patches. As a particular example, the image patch generation system can segment each column or row of the image into n sub-sequences of the pixels of the column or row, such that each sub-sequence represents an image patch.

Although the images 310-360 are depicted in FIG. 3 as two-dimensional images (or images that are two-dimensional with multiple channels, e.g., RGB images), generally the neural network system can be configured to generate predictions for any type of image, as described above with reference to FIG. 1.

Figure 4:
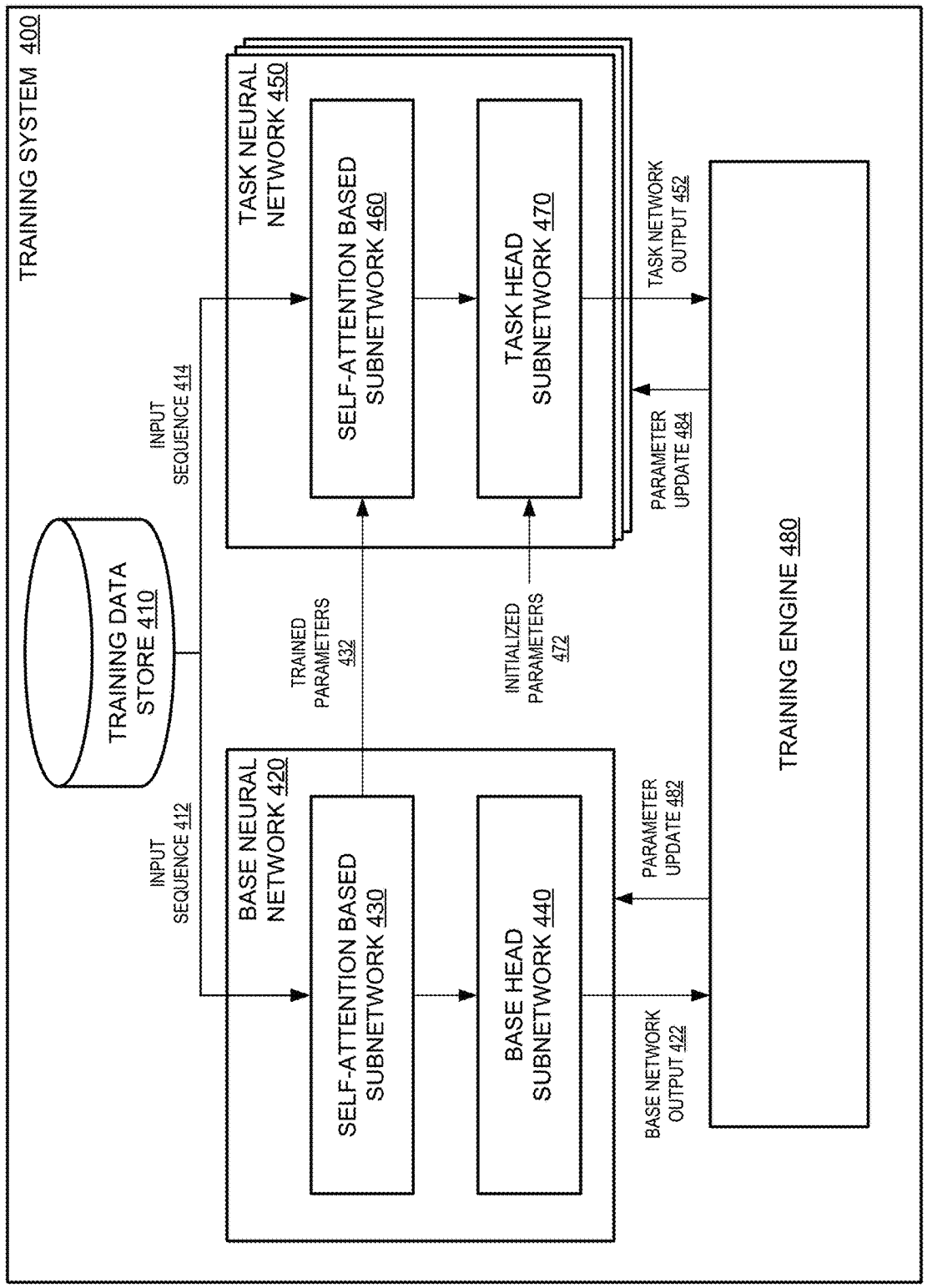
FIG. 4 is a diagram of an example training system.

FIG. 4 is a diagram of an example training system 400. The training system 400 is an example of a system implemented as computer programs on one or more computers in one or more locations, in which the systems, components, and techniques described below can be implemented.

The training system 400 is configured to train a base neural network 420 to perform a first machine learning task, and one or more task neural networks 450 to perform respective second machine learning tasks that are different from the first machine learning task. In particular, the training system 400 can use trained parameters from the base neural network 420 to generate the parameters for the one or more task neural networks 450.

The base neural network 420 and the one or more task neural networks 450 are each configured to process input sequences representing images, where the input sequence includes one or more elements corresponding to respective image patches of the corresponding images, as described above. The first machine learning task and the one or more second machine learning tasks can each be any appropriate machine learning task. For example, the first machine learning task and the one or more second machine learning tasks can include one or more of the tasks discussed above with reference to FIG. 1.

In some implementations, the first machine learning task (i.e., the machine learning task on which the self-attention based subnetwork 430 is pre-trained) is a self-supervised machine learning task. That is, the training system 400 can train the base neural network 420 using a training data set that does not include ground-truth labels, instead using a portion of the training data set the ground-truth labels for the rest of the training data set. As a particular example, the first machine learning task can be a masked image prediction task, where the base neural network 420 processes input sequences 412 representing portions of respective images (i.e., images for which one or more pixels have been "masked"), and generates a base network output 422 representing a prediction of the content of the masked portion of the image. For example, the training system 400 can generate an initial input sequence that includes a respective element for each image patch in the full, un-masked image, then remove one or more of the elements or replace one or more of the elements using the same "mask" token that identifies that the corresponding image patch has been masked from the image.

Each of the neural networks includes a respective self-attention based subnetwork and a respective head subnetwork. In particular, the base neural network 420 includes a self-attention based subnetwork 430 and a base head subnetwork 440, and each of the task neural networks 450 includes a respective self-attention based subnetwork 460 and a respective task head subnetwork 470. Each self-attention based subnetwork and each head subnetwork 440 can be configured as described above with reference to the self-attention based subnetwork 140 and head subnetwork 150, respectively, depicted in FIG. 1.

Each of the self-attention based subnetworks 430 and 460 can be configured similarly to each other, e.g., can have the same network architecture with the same number and size of neural network layers. Each of the base head subnetworks 440 and 470, however, can be specifically configured for the corresponding machine learning task. That is, the base head subnetwork 440 can be specifically configured for the first machine learning task and each task head subnetwork 470 can be specifically configured for the corresponding second machine learning task. For example, each head subnetwork 440 and 470 can be configured to generate a respective network output having the format required for the corresponding machine learning task. Thus, the different head subnetworks can have different network architectures. As a particular example, one or more of the head subnetworks can be multi-layer perceptrons including one, two, or more feedforward neural network layers.

The training system 400 includes a training data store that is configured to maintain a respective training data set for the first machine learning task and the one or more second machine learning tasks. In some implementations, the training data sets for the second machine learning tasks are smaller than the training data set for the first machine learning task, and thus the training system 400 can be configured to leverage trained parameters of the base neural network 420, trained using the larger training data set, to supplement the training of the task neural networks 450, which can be hindered by the relative lack of training data.

Each training data set can be generated from a respective set of training images; that is, each training example in a particular training data set can be generated from a respective training image from the set of training images corresponding to the training data set. In some implementations, each training data set has been generated from the same set of images; in some other implementations, different training data sets can be generated from different sets of images.

The training system can provide an input sequence 412 from the training data set corresponding to the first machine learning task to the base neural network 420. The training system 400 can process the input sequence using the self-attention based subnetwork 430 and the base head subnetwork 440 to generate a base network output 422.

The training system 400 includes a training engine 480 that is configured to obtain the base network output 422, determine an error of the base network output 422, and generate a parameter update 482 for the base neural network 420 according to the error. The training engine 480 can generate the parameter update 482 using any appropriate training technique. For example, the training engine 480 can use one or more of supervised learning, unsupervised learning, semi-supervised learning, self-supervised learning, distillation learning (where the base neural network 420 is trained to generate base network outputs 422 that match the outputs of a "teacher" neural network), or adversarial learning (where the base neural network 420 is trained to generate base network outputs 422 that are predicted, by a discriminator neural network, not to have been generated by the base neural network 420).

As a particular example, in implementations in which the training system 400 executes supervised learning using a training data set that includes ground-truth network outputs, the training engine 480 can determine a difference between the base network output 422 and the ground-truth network output corresponding to the input sequence 412. The training engine 480 can generate the parameter update 482 by backpropagating the error through the base neural network 420 and performing stochastic gradient descent. The parameter update 482 can include a respective update for the parameters of both the self-attention based subnetwork 430 and the base head subnetwork 440.

After completing training of the base neural network 420, the training system 100 can use the trained parameters of the base neural network 420 to generate the one or more task neural networks 450.

In particular, the training system 400 can obtain the trained parameters 432 of the self-attention based subnetwork and apply the trained parameters to the self-attention based subnetwork 460, i.e., set the parameters of the self-attention based subnetwork 460 to be the same as the trained parameters 432. As described above, each of the self-attention based subnetworks 430 and 460 can be configured similarly to each other, and thus the training of the subnetwork 430 can be transferred to each of the subnetworks 460.

During the training of the base neural network 420, the self-attention based subnetwork 430 can learn to generate representations of input sequences that encode information about the corresponding input images that is useful for performing multiple different machine learning tasks, including the first machine learning task and the one or more second machine learning tasks. That is, the information encoded by the self-attention based subnetwork 430 into the representations can be useful for the second machine learning tasks, even though the self-attention subnetwork 430 was not trained using the second machine learning tasks.

However, instead of obtaining the trained parameters of the base head subnetwork 440 and applying them to the task head subnetwork 470, the training system 100 can generate initialized parameters 472 for the task subnetwork 470, e.g., by randomly sampling the initialized parameters. Because each of the head subnetworks 440 and 470 are configured specifically for their respective machine learning tasks, the training of the base head subnetwork 440 cannot be transferred to the task head subnetworks 470.

In other words, to generate one of the task neural networks 450, the training system 400 can discard the base head subnetwork 440 from the base neural network 440 and replace the base head subnetwork 440 with a newly-initialized task head subnetwork 470.

In some implementations, the self-attention based subnetworks 430 and 460 are larger (e.g., have more network parameters) than the head subnetworks 440 and 470. As particular examples, the self-attention based subnetworks can include millions, hundreds of millions, billions, or hundreds of billions of parameters, while the head subnetworks can include hundreds, thousands, or hundreds of thousands of parameters. Thus, by pre-training the self-attention based subnetwork 430 and using the pre-trained subnetwork 430 to determine parameters for the one or more task head subnetworks 470, the training system 400 can train the task neural networks 450 significantly more efficiently than if each task neural network 450 were trained from scratch. Much of the time and computational cost of training the task neural networks 450 can be done "up-front" during the pre-training of the self-attention based subnetwork 430. That is, the cost of training the self-attention based subnetwork 430 can be amortized over multiple task neural networks 450.

The training system can train the task neural networks to generate trained parameters for the new task head subnetworks 470.

In particular, for each task neural network 450, the training system 100 can use the task neural network 450 to process an input sequence 414 from the training data set corresponding to the second machine learning task of the task neural network 450, generating a task network output 452. In some implementations, the input sequence 414 has a different form (e.g., a different number or size of elements) than the input sequence 412. In these implementations, the task neural network 450 can include one or more input neural network layers preceding the self-attention based subnetwork 460 that are configured to project the input sequence 414 into the dimensionality that the self-attention based subnetwork 460 is configured to process.

In some implementations in which machine-learned positional embeddings are incorporated into the elements of the input sequence 414, the training system 400 fine-tunes the positional embeddings during the training of the task neural networks 450. In some other such implementations, the training system 400 does not fine-tune the positional embeddings.

In some implementations, the set of training images used to generate the training data set for the base neural network 420 includes images having a different resolution than the set of training images used to generate the training data set for the task neural network 450. That is, the input sequence 414 can represent an image having a different resolution than the image represented by the input sequence 412.

As a particular example, the input sequence 414 can represent a higher-resolution image than the input sequence 412; that is, the self-attention based subnetwork can be fine-tuned on larger images than during its original training. In some implementations in which each image patch is the same size and each pixel of each image is included in exactly one image patch, the input sequence 412 and the input sequence 414 can have the same number of elements; that is, each element of the input sequence 414 represents a larger image patch than each element of the input sequence 412.

In some other such implementations, the elements of the input sequence 412 and the input sequence 414 can represent image patches of the same size; that is, the input sequence 414 can be longer than the input sequence 412. This can pose a problem in implementations that incorporate machine-learned positional embeddings into the elements of the input sequences 412 and 414 (e.g., positional embeddings that were learned during the training of the base neural network 420, as described above), because the additional elements of the input sequence 414 do not have learned positional embeddings.

Thus, in some implementations, the training system 400 can determine positional embeddings for the additional elements using the positional embeddings learned for the input sequences of the base neural network 420. For example, the training system 400 can initialize the positional embeddings for the additional elements (e.g., by initializing each positional embedding to be zero or by randomly initializing the positional embeddings) and train the positional embeddings during the training of the task neural networks 450.

As another example, the training system 400 can perform two-dimensional interpolation on the positional embeddings learned for the base neural network 420, according to the location of the additional image patches in the training image. To name just a few particular examples, the training system 400 can use two-dimensional linear interpolation, two-dimensional bicubic interpolation, or two-dimensional Lanczos interpolation.

The training engine 480 can obtain the task network output 452, determine an error of the task network output 452, and generate a parameter update 484 for the task neural network 450 according to the error.

In some implementations, the parameter update 484 includes a respective update for the parameters of both the self-attention based subnetwork 460 and the base head subnetwork 470. That is, the training system 400 can further fine-tune the parameters of the self-attention based subnetwork 460, even though the parameters have already been trained during the training of the base neural network 420.

In some other implementations, the parameter update 484 only includes an update for the parameters of the task head subnetwork 470. That is, the training system 100 can "freeze" the parameters of the self-attention based subnetwork 460 during the training of the task neural network 450.

In some implementations, instead of pre-training the base neural network 420, the training system 400 can obtain the trained parameters 432 of the self-attention based subnetwork 430 from an external system.

In some implementations, as described above with reference to FIG. 1, after the one or more task neural networks 450 have been trained, the self-attention based subnetwork 460 a respective task head subnetworks 470 can be deployed separately, e.g., on separate computing devices that are communicatively connected. For example, the self-attention based subnetwork 460 can be deployed at a data center, while the task head subnetwork 470 can be deployed on an edge device that has limited computational resources. The edge device can then provide an image to the data center, which can process the image using the self-attention based subnetwork 460 to generate an embedding of the image. The data center can then provide the embedding back to the edge device, which can process the embedding using the respective task head subnetwork 470 to generate a prediction of the image.

Figure 5:
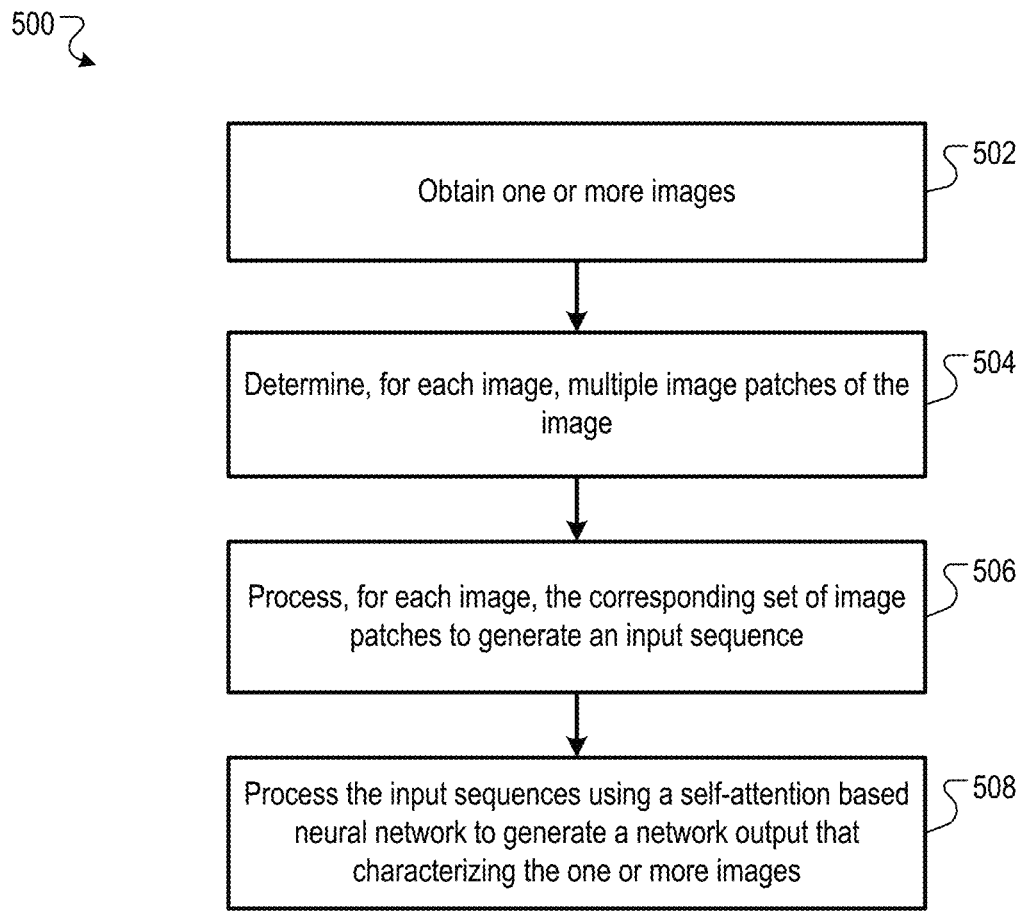
FIG. 5 is a flow diagram of an example process for generating a prediction about one or more images using a self-attention based neural network.

FIG. 5 is a flow diagram of an example process 500 for generating a prediction about one or more images using a self-attention based neural network. For convenience, the process 500 will be described as being performed by a system of one or more computers located in one or more locations. For example, a neural network system, e.g., the neural network system 100 depicted in FIG. 1, appropriately programmed in accordance with this specification, can perform the process 500.

The self-attention based neural network can include one or more self-attention neural network layers. For example, the self-attention based neural network can be the neural network 130 described above with reference to FIG. 1.

The system obtains one or more images (step 502). Each image includes multiple pixels.

The system determines, for each image of the one or more images, a set of multiple image patches of the image (step 504). Each image patch includes a different subset of the pixels of the image.

The system processes, for each image of the one or more images, the corresponding set of image patches to generate an input sequence (step 506). The input sequence can include a respective element at each of multiple input positions, where one or more of the input elements correspond to respective patches of the image.

In some implementations, for each image patch, the system can generate a respective one-dimensional initial input element that includes the pixels of the image patch. For instance, the initial input element can be a flattened version of the image patch. The system can then generate the input element corresponding to the image patch using the initial input element. For example, the system can generate the input element by processing the initial input element using a second neural network. The second neural network can be an embedding neural network that is a component of an image patch embedding system, e.g., the image patch embedding system 120 described above with reference to FIG. 1. As a particular example, the embedding neural network can include one or more fully-connected neural network layers.

In some implementations, the system can process the image patches to generate respective intermediate input elements. For example, the intermediate input elements can be the flattened version of the image patches, or a processed version thereof (e.g., as generated by an embedding neural network as described above). The system can then combine each intermediate input element with a respective positional embedding representing a positon of the corresponding image patch in the image. For example, each positional embedding can be an integer. As another example, each positional embedding can be machine-learned.

In some implementations, the input sequence corresponding to a particular image includes one or more input elements in addition to the input elements corresponding to the image patches of the image. For example, the input sequence can include a machine-learned tensor, e.g., the class embedding 124 described above with reference to FIG. 1.

The system processes the input sequences using the self-attention based neural network to generate a network output that characterizes the one or more images (step 508).

For example, the system can process the input sequence using a self-attention based subnetwork of the self-attention based neural network (e.g., the self-attention based subnetwork 140 described above with reference to FIG. 1) to generate a respective output element for each input element of the input sequence.

The system can then process the one or more output elements using a third neural network to generate the network output. For example, the third neural network can be another subnetwork of the self-attention based neural network, e.g., a head subnetwork configured similarly to the head subnetwork 150 described above with reference to FIG. 1. As a particular example, the head subnetwork can be configured to process only the output element corresponding to the machine-learned tensor (e.g., the class embedding 124) top generate the network output.

In some such implementations, the head subnetwork is configured to generate network outputs of a first type (e.g., corresponding to a first machine learning task), and the self-attention based subnetwork has been trained concurrently with a fourth neural network to generate network outputs of a second type that is different from the first type (e.g., a second machine learning task). The fourth neural network can be a different head subnetwork, e.g., the base head subnetwork 440 described above with reference to FIG. 4.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
  obtaining one or more images comprising a plurality of pixels;
  determining, for each image of the one or more images, a plurality of image patches of the image, wherein each image patch comprises a different subset of the pixels of the image;
  processing, for each image of the one or more images, the corresponding plurality of image patches to generate an input sequence comprising a respective input element at each of a plurality of input positions, wherein a plurality of the input elements correspond to respective different image patches; and
  processing the input sequences using a neural network to generate a network output that characterizes the one or more images, wherein the neural network comprises one or more self-attention neural network layers.

Embodiment 2 is the method of embodiment 1, wherein processing the plurality of image patches corresponding to an image to generate an input sequence comprises, for each image patch:
  generating a respective one-dimensional initial input element that includes the pixels of the image patch; and
  generating a respective input element using the respective initial input element.

Embodiment 3 is the method of embodiment 2, wherein each image patch has dimensionality L×W×C, wherein C represents a number of channels of the image, and wherein each initial input element has dimensionality 1×(L·W·C).

Embodiment 4 is the method of any one of embodiments 2 or 3, wherein generating a respective input element using the respective initial input element comprises processing the initial input element using a second neural network.

Embodiment 5 is the method of embodiment 4, wherein the second neural network comprises one or more fully-connected neural network layers.

Embodiment 6 is the method of any one of embodiments 1-5, wherein processing the plurality of image patches corresponding to an image to generate an input sequence comprises:
  processing the plurality of image patches to generate respective intermediate input elements; and
  combining, for each intermediate input element, the intermediate input element with a positional embedding representing a position of the corresponding image patch in the image to generate a respective input element.

Embodiment 7 is the method of embodiment 6, wherein each positional embedding is an integer.

Embodiment 8 is the method of embodiment 6, wherein each positional embedding is machine-learned.

Embodiment 9 is the method of any one of embodiments 1-8, wherein a particular input element in the input sequence is a machine-learned tensor.

Embodiment 10 is the method of any one of embodiments 1-9, wherein processing an input sequence using the neural network to generate a network output that characterizes the image comprises:
  processing the input sequence using the neural network to generate a respective output element for each input element in the input sequence; and
  processing one or more of the output elements using a third neural network to generate the network output.

Embodiment 11 is the method of embodiment 10, wherein:
  the third neural network is configured to generate network outputs of a first type; and
  the neural network has been trained concurrently with a fourth neural network to generate network outputs of a second type that is different from the first type.

Embodiment 12 is the method of embodiment 11, wherein a plurality of network parameters of the neural network have been updated during training of the third neural network.

Embodiment 13 is the method of any one of embodiments 10-12, wherein the third neural network is a multi-layer perceptron.

Embodiment 14 is the method of any one of embodiments 10-13, wherein, for a respective input sequence:
  a particular input element in the input sequence is a machine-learned tensor; and
  processing one or more output elements using the third neural network comprises processing the output element corresponding to the particular input element using the third neural network to generate the prediction of the image.

Embodiment 15 is the method of any one of embodiments 1-14, wherein one or more of the self-attention neural network layers are multi-head self-attention neural network layers.

Embodiment 16 is the method of any one of embodiments 1-15, wherein the neural network comprises a sequence of one or more subnetworks, each subnetwork configured to receive a respective subnetwork input for each of the plurality of input positions and to generate a respective subnetwork output for each of the plurality of input positions, wherein each subnetwork comprises a self-attention neural network layer and a position-wise feedforward neural network layer.

Embodiment 17 is the method of embodiment 16, wherein each subnetwork further comprises one or more of:
  a first layer normalization layer that applies layer normalization to the subnetwork inputs for each of the plurality of input positions;
  a first residual connection layer that combines an output of the self-attention neural network layer with the subnetwork inputs for each of the plurality of input positions;
  a second layer normalization layer that applies layer normalization to an output of the first residual connection layer; or
  a second residual connection layer that combines an outputs of the position-wise feed-forward neural network layer with the output of the first residual connection layer.

Embodiment 18 is the method of any one of embodiments 1-17, wherein:
  the network output comprises a classification output that includes a respective score corresponding to each of multiple categories, a score for a category indicating a likelihood that the image belongs to the category;
  the network output comprises a pixel-level classification output that includes, for each pixel in the image, a respective score corresponding to each of multiple categories, wherein the score for a category indicates a likelihood that the pixel belong to the category;
  the network output comprises coordinates for one or more bounding boxes that enclose respective objects depicted in the image, or
  the neural network receives multiple images that are video frames of a video, and the network output comprises an output that characterizes the video frames.

Embodiment 19 is the method of embodiment 18, wherein the output that characterizes the video frames comprises an output that characterizes whether the video frames depict a person performing a particular action.

Embodiment 20 is a system comprising: one or more computers and one or more storage devices storing instructions that are operable, when executed by the one or more computers, to cause the one or more computers to perform the method of any one of embodiments 1 to 19.

Embodiment 21 is a computer storage medium encoded with a computer program, the program comprising instructions that are operable, when executed by data processing apparatus, to cause the data processing apparatus to perform the method of any one of embodiments 1 to 19.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
  obtaining one or more images comprising a plurality of pixels;
  determining, for each image of the one or more images, a plurality of image patches of the image, wherein each image patch comprises a different subset of the pixels of the image;
  processing, for each image of the one or more images, the corresponding plurality of image patches to generate an input sequence comprising a respective input element at each of a plurality of input positions, wherein a plurality of the input elements correspond to respective different image patches, and wherein processing the plurality of image patches corresponding to an image to generate an input sequence comprises, for each image patch:
    generating a respective initial input element that includes the pixels of the image patch; and
    generating a respective input element corresponding to the image patch by processing the respective initial input element using a second neural network; and
  processing the input sequences using a neural network to generate a network output that characterizes the one or more images, wherein the neural network comprises one or more self-attention neural network layers.

2. The method of claim 1, wherein each image patch has dimensionality L×W×C, wherein C represents a number of channels of the image, and wherein each initial input element has dimensionality 1×(L·W·C).

3. The method of claim 1, wherein the second neural network comprises one or more fully-connected neural network layers.

4. The method of claim 1, wherein the second neural network applies a learned linear projection to the respective input element.

5. The method of claim 1, wherein processing the plurality of image patches corresponding to an image to generate an input sequence comprises:
  updating each input element by combining, for each input element, the input element with a positional embedding representing a position of the corresponding image patch in the image to generate a respective input element.

6. The method of claim 5, wherein each positional embedding is an integer.

7. The method of claim 5, wherein each positional embedding is machine-learned.

8. The method of claim 1, wherein a particular input element in the input sequence is a machine-learned tensor.

9. The method of claim 1, wherein processing an input sequence using the neural network to generate a network output that characterizes the image comprises:
processing the input sequence using the neural network to generate a respective output element for each input element in the input sequence; and
processing one or more of the output elements using a third neural network to generate the network output.

10. The method of claim 9,
wherein:
the third neural network is configured to generate network outputs of a first type; and
the neural network has been trained concurrently with a fourth neural network to generate network outputs of a second type that is different from the first type.

11. The method of claim 10, wherein a plurality of network parameters of the neural network have been updated during training of the third neural network.

12. The method of claim 9, wherein the third neural network is a multi-layer perceptron.

13. The method of claim 9, wherein, for a respective input sequence:
a particular input element in the input sequence is a machine-learned tensor; and
processing one or more output elements using the third neural network comprises processing the output element corresponding to the particular input element using the third neural network to generate the prediction.

14. The method of claim 1, wherein one or more of the self-attention neural network layers are multi-head self-attention neural network layers.

15. The method of claim 1, wherein the neural network comprises a sequence of one or more subnetworks, each subnetwork configured to receive a respective subnetwork input for each of the plurality of input positions and to generate a respective subnetwork output for each of the plurality of input positions, wherein each subnetwork comprises a self-attention neural network layer and a position-wise feedforward neural network layer.

16. The method of claim 15, wherein each subnetwork further comprises one or more of:
a first layer normalization layer that applies layer normalization to the subnetwork inputs for each of the plurality of input positions;
a first residual connection layer that combines an output of the self-attention neural network layer with the subnetwork inputs for each of the plurality of input positions;
a second layer normalization layer that applies layer normalization to an output of the first residual connection layer; or
a second residual connection layer that combines an outputs of the position-wise feed-forward neural network layer with the output of the first residual connection layer.

17. The method of claim 1, wherein:
the network output comprises a classification output that includes a respective score corresponding to each of multiple categories, a score for a category indicating a likelihood that the image belongs to the category.

18. The method of claim 1, wherein:
the network output comprises a pixel-level classification output that includes, for each pixel in the image, a respective score corresponding to each of multiple categories, wherein the score for a category indicates a likelihood that the pixel belong to the category.

19. The method of claim 1, wherein
the network output comprises coordinates for one or more bounding boxes that enclose respective objects depicted in the image.

20. A system comprising one or more computers and one or more storage devices storing instructions that when executed by the one or more computers cause the one more computers to perform operations comprising:
obtaining one or more images comprising a plurality of pixels;
determining, for each image of the one or more images, a plurality of image patches of the image, wherein each image patch comprises a different subset of the pixels of the image;
processing, for each image of the one or more images, the corresponding plurality of image patches to generate an input sequence comprising a respective input element at each of a plurality of input positions, wherein a plurality of the input elements correspond to respective different image patches, and wherein processing the plurality of image patches corresponding to an image to generate an input sequence comprises, for each image patch:
generating a respective initial input element that includes the pixels of the image patch; and
generating a respective input element corresponding to the image patch by processing the respective initial input element using a second neural network; and
processing the input sequences using a neural network to generate a network output that characterizes the one or more images, wherein the neural network comprises one or more self-attention neural network layers.

21. One or more non-transitory computer storage media storing instructions that when executed by one or more computers cause the one more computers to perform operations comprising:
obtaining one or more images comprising a plurality of pixels;
determining, for each image of the one or more images, a plurality of image patches of the image, wherein each image patch comprises a different subset of the pixels of the image;
processing, for each image of the one or more images, the corresponding plurality of image patches to generate an input sequence comprising a respective input element at each of a plurality of input positions, wherein a plurality of the input elements correspond to respective different image patches, and wherein processing the plurality of image patches corresponding to an image to generate an input sequence comprises, for each image patch:
generating a respective initial input element that includes the pixels of the image patch; and
generating a respective input element corresponding to the image patch by processing the respective initial input element using a second neural network; and processing the input sequences using a neural network to generate a network output that characterizes the one or more images, wherein the neural network comprises one or more self-attention neural network layers.

* * * * *